United States Patent Office 3,361,822
Patented Jan. 2, 1968

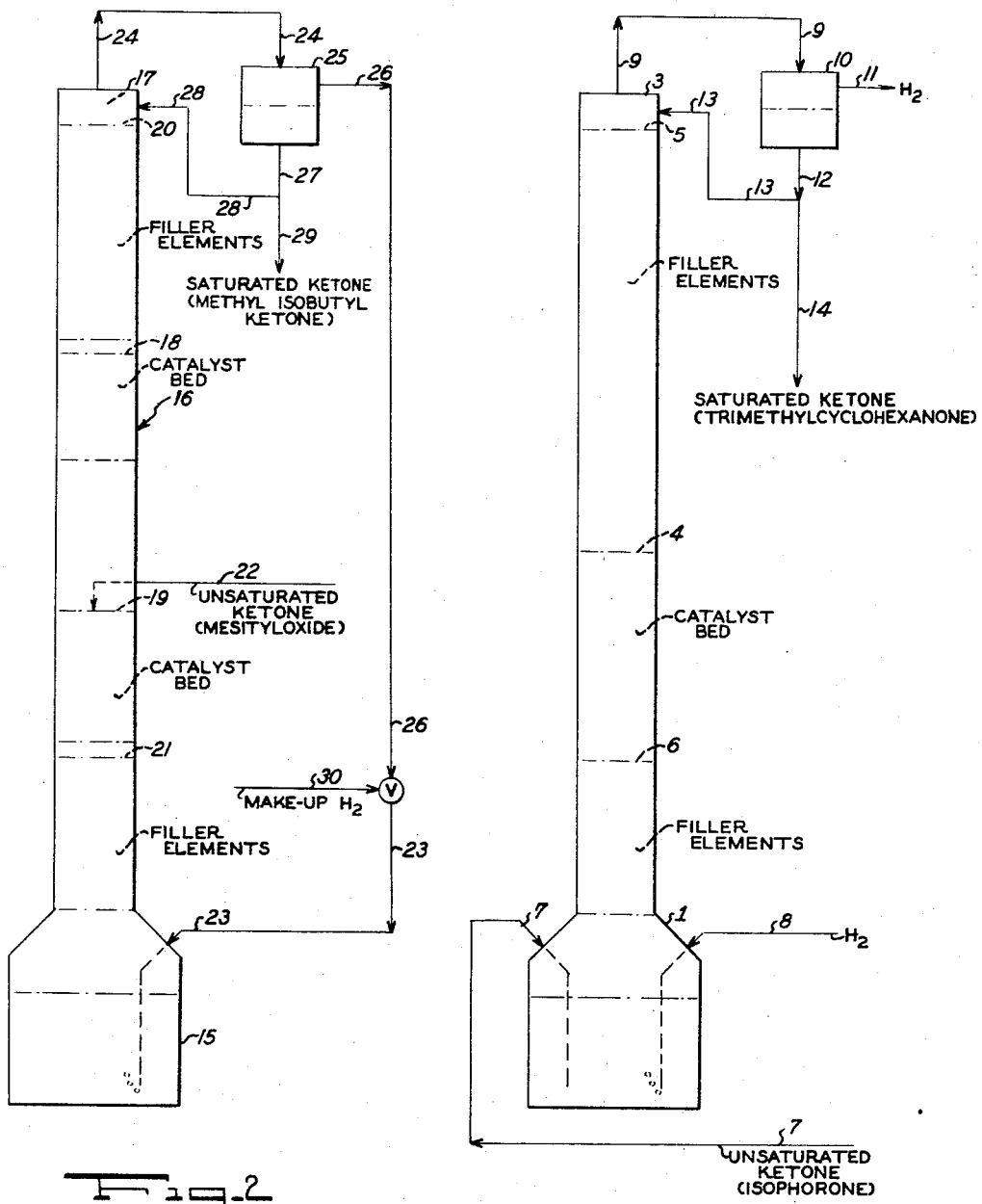

3,361,822
PROCESS FOR THE SELECTIVE HYDROGENATION OF UNSATURATED KETONES
Karl Schmitt, Herne, Josef Disteldorf, Wanne-Eickel, Horst Schnurbusch, Herne, and Walter Hilt, Wanne-Eickel, Germany, assignors to Scholven-Chemie Aktiengesellschaft, Gelsenkirchen-Buer, Germany
Filed Apr. 14, 1964, Ser. No. 361,608
Claims priority, application Germany, Apr. 27, 1963, Sch 33,199
10 Claims. (Cl. 260—586)

The present invention relates to a process for the selective hydrogenation of unsaturated ketones, and more particularly to an improvement in the process for the continuous production of saturated ketones from unsaturated ketones by catalytic hydrogenation at temperatures between about 50–250° C., in which the catalytic hydrogenation is carried out in a distillation zone under reflux of a portion of the distilling saturated ketone.

It is known in the prior art to hydrogenate unsaturated ketones, such as mesityl oxide, in such a manner that principally the olefinic double bond is eliminated and saturated ketones result, such as methyl isobutyl ketone, where mesityl oxides is used at starting unsaturated ketone. The reaction may be performed batch-wise or continuously, and in the latter case sump processes, spray processes, and gaseous phase processes are useable. The catalysts generally are the metals of the 8th Sub-Group of the Periodic System. Temperatures ranging from about 50 to 250° C. may be used as well as pressures of 1 atmosphere and more.

The requirement that the reaction be selective to the desired hydrogenation, of course, leads to considerable difficulties which can be diminished only by precise adjustment to one another of the variables of the reaction. Nevertheless, unreacted and/or over-hydrogenated products have to be expected, and these greatly encumber the purification step which is thereby necessitated.

It is an object of the present invention to overcome the foregoing drawbacks and to provide a process for the selective hydrogenation of unsaturated ketones in high yields and high purity with a minimum of undesired by-products including over-hydrogenated products.

It is another object of the present invention to combine the hydrogenation of the unsaturated ketone with a distillation process under reflux of a portion of the distilling saturated ketone formed to enhance the distillation, take up the reaction heat produced during the hydrogenation, and thus maintain the catalyst at the desired reaction temperature.

It is still another object of the present invention to provide a combined distillation and hydrogenation process in a single apparatus or distilling-hydrogenation reaction zone to achieve a better utilization of space, a simplicity of operation, and a saving in the over-all cost of operations and regulating equipment.

It is still another object of the present invention to provide a combined distillation and hydrogenation process of the foregoing type in such a manner that the heat of reaction is completely absorbed by direct heat exchange transfer under the reflux conditions utilized, so that a total uniformity and regulation of the temperatures in the distillation-hydrogenation reaction zone can be achieved.

It is still a further object of the present invention to provide a process of the foregoing type under conditions in which the reaction product is preserved in the desired form and the catalyst is not objectionally poisoned or coated with resinous by-products which would shorten the life of such catalyst.

It is still another object of the present invention to provide a process of the foregoing type in which reflux is used for flushing and washing the catalyst to keep the same clear of contaminants.

It is still a further object of the present invention to provide a process of the foregoing type in which advantageously the distilled saturated ketone end product may be recovered in high purity rendering subsequent purification in most cases superfluous.

It is still another object of the present invention to provide a process of the foregoing type in which the hydrogenation reaction may be carried out at lower temperatures than otherwise necessary, and therefore at correspondingly lower pressures, with the over-all result that milder conditions and generally a better separation of the distilled product are possible.

Other and further objects of the present invention will become apparent from a study of the within specification and accompanying drawing in which:

FIG. 1 shows a schematic side view of a distillation-hydrogenation reaction zone including a sump, an intermediate column containing a catalyst bed, and a head with provision for separating the reaction products and recycling a portion of the saturated ketone back to the head of the column as reflux.

FIG. 2 is a schematic view similar to FIG. 1 but in which more than one separate catalyst bed is provided in the intermediate column and in which the starting unsaturated ketone is introduced intermediate two catalyst beds rather than into the sump with the hydrogen as is the case in the embodiment of FIG. 1 of the invention.

It has been found in accordance with the present invention that an improvement in the process for the continuous production of saturated ketones from unsaturated ketones by catalytic hydrogenation at temperatures between about 50–250° C. may be provided. The improvement comprises carrying out the catalytic hydrogenation in a distillation zone while distilling off from such distillation zone the saturated ketone being produced under reflux of a portion of the distilling saturated ketone.

In general, the pressures used in accordance with the invention are in the range of between 100 mm. Hg and 100 atmospheres. Preferably, the pressure used is at least 1 atmosphere, and the hydrogen is used preferably in excess of the stoichiometrical amount. As catalysts, conveniently a metal of the 8th Sub-Group of the Periodic System may be used. The preferred metals of this group are nickel, cobalt, iron, platinum, palladium. Metals of the 1st Group of the Periodic System, such as copper, silver, gold, are also possible catalysts, preferably in mixture with the said metals of the 8th Group. For example a catalyst containing nickel and also copper and silver, shows good results. The metals may be used in pure form or contained in the usual catalyst carrier materials such as alumina gel, silica gel, kieselguhr, montmorillonite, bentonite, diatomaceous earth and the like, the metals being used in quantities of about 0.1–50% by weight of the carrier material. A portion of the saturated ketone being distilled is advantageously returned to the distillation zone at a reflux ratio between about 1–10, preferably about 2–5.

More specifically, the distilling zone includes a lower sump, an intermediate column containing a hydrogenation catalyst, and an upper head, and the hydrogen used for the hydrogenation and the unsaturated ketone are introduced into the sump, while the saturated ketone being distilled off is recovered from the head of the column. Preferably, the catalyst is in bed form and the portion of the saturated ketone being refluxed is returned in part to the head and in part to the column at a point below the catalyst bed. Alternatively, the distilling zone includes a lower sump, an intermediate column containing a plurality of separate spaced apart catalyst beds, and an upper head, and the hydrogen used for the hydrogenation is introduced into the sump while the unsaturated ketone is introduced into the intermediate column between corresponding catalyst beds, with the saturated ketone being distilled off and recovered from the head.

In accordance with a particular embodiment of the present invention, an improvement in the process for the continuous production of saturated ketones from unsaturated ketones and hydrogen in excess of stoichiometrical amount by catalytic hydrogenation in the presence of a metal of the 8th Sub-Group of the Periodic System as catalyst at temperatures between about 50–250° C. is provided, the improvement for the selective hydration of unsaturated ketones comprising continuously carrying out the catalytic hydration in a distilling zone having a lower sump, an intermediate column containing a hydrogenation catalyst in bed form, and an upper head, while continuously distilling off from such distillation zone the saturated ketone being produced under continuous reflux of a portion of the distilling saturated ketone in a reflux ratio between about 2–5. The temperature maintained in the head is generally lower than that in the column and the temperature maintained in the column is generally lower than that in the sump, so that the desired conditions will permit selective hydrogenation and selective distillation of the hydrogenated unsaturated ketone reaction product. Preferably, as aforesaid the hydrogen used for the hydrogenation and the unsaturated ketone are introduced into the sump, with the saturated ketone being distilled off and recovered from the head. Moreover, the catalyst is preferably in the form of a bed, and the portion of the saturated ketone being refluxed is returned in part to the head and in part to the column at a point below the catalyst bed. Alternately, the hydrogen used for the hydrogenation is introduced into the sump, and the catalyst is in the form of a plurality of separate, spaced apart catalyst beds, whereby the unsaturated ketone may be introduced into the column between corresponding catalyst beds. The saturated ketone being distilled off is advantageously removed from the head and the portion of the saturated ketone being refluxed is returned in part to the head and in part to the column at a point below at least one of the catalyst beds.

Accordingly, unsaturated ketones, such as mesityl oxide, isophorone, homoisophorone, etc. can be transformed in a simple and very selective manner into the corresponding saturated ketones. The present process is based upon the fundamental concept of a combination of hydrogenation and distillation, with the reaction zone to be considered as a distillation apparatus having a sump, an intermediate column, and a distilling head. At an appropriate height within the column, a catalyst bed may be arranged therefore, and therebelow, as well as especially thereabove, fractionating or distilling elements, such as Raschig rings are located.

Actually all of the conventional hydrogenation catalysts may be used in accordance with the instant selective hydrogenation, especially the metals of the 8th Sub-Group of the Periodic System as aforesaid.

The starting reactant is fed advantageously to the distilling zone in an amount sufficient to compensate for the amount of end-product being recovered from the head of the column. The hydrogen is also fed into the sump, preferably in excess, but in special cases, the hydrogen may be replaced in an appropriate manner by a gas mixture which contains hydrogen. The reaction temperatures correspond to the general range of temperatures contemplated heretofore, i.e. between about 50–250° C. in the zone of the catalytic reaction. Aside from this, the conditions, such as sump temperature, proportions of starting material to be hydrogenated to the catalyst, rate of flow of hydrogen, etc., may be selected in such a manner as to assure optimum performance of the reaction. Such selection can be determined easily in each individual case by simple preliminary tests as the artisan will appreciate. The hydrogenation of the starting reactant will take place at the catalyst bed in accordance with the conditions and the amount of starting material introduced, and the vapors leaving the catalyst area will be condensed and rectified due to the positioning of fractionating elements, such as Raschig rings thereabove.

Inasmuch as the reaction product is made up of the more highly volatile components, the unreacted portions will be washed back and contacted once again with the catalyst due to the reflux conditions utilized. The actual distillate recovered from the head of the column is divided suitably in a condenser into a collected portion and a reflux portion, with the reflux portion being recycled back to the head of the column. As a result of the combination of distillation and hydrogenation carried out in accordance with the present invention, a two-fold function is assigned to the reflux. On the one hand, the reflux brings about the fractionation or distillation in the required manner, and on the other hand, the reflux carries off the reaction heat produced in the hydrogenation in order thereby to keep the catalyst at the desired reaction temperature.

It will be appreciated that the process of the present invention is not limited to the use of normal pressures, but in fact the principle of the present invention permits the use of vacuum pressures and superatmospheric pressures, i.e. elevated pressures as well.

Furthermore, it is possible to modify the apparatus within wide limits for particular effect. For example, it may be advantageous to divide the reflux and introduce a part thereof to the head of the column and another part thereof directly to the under side of the catalyst bed or layer within the intermediate column, as aforesaid.

Under certain circumstances, a better result can be achieved if the catalyst bed is actually divided into two or more parts, with the starting material being fed between two catalyst layers or among the interspaces between more than two catalyst layers, i.e. where a plurality of catalyst layers or beds are contemplated, rather than to the sump of the system, as indicated above.

In view of the foregoing, a plurality of advantages may be appreciated in carrying out the selective hydrogenation of unsaturated ketones in accordance with the present invention. By combining the distillation and hydrogenation in one apparatus or zone, better use of space is achieved, plus simplicity of operation, and hence a saving of labor and in regulating apparatus. The heat of reaction is completely carried away from the hydrogenation zone in the catalyst bed and utilized as a result of direct transfer through the portions of the reaction mixture being distilled. In contrast to indirect heat exchange in the vicinity of the catalyst, a total uniformity and regulation of the temperatures in the reaction zone are achieved, and hence an extremely good preservation both of the products formed and the integrity of the catalyst surface. A washing effect and flushing by the reflux keeps the catalyst constantly washed clean and prevents contamination by resinous by-products. Even in the event of the possible occurrence of simultaneous and/or secondary reactions, the simultaneously occurring fractionation or distillation in the catalyst zone results in better selectivity, so that in the end only the desired product is drawn from the system by distillation, whereupon the need for subsequent purification of the final product is rendered superfluous in most cases. The contact of the organic vapors with hydrogen in the distillation-hydrogenation reaction zone leads to an over-all reduction of the temperatures in the distillation, which is equivalent to a reduction in pressure, and this results in milder conditions and often a better separation or recovery of the reaction product being distilled.

The following examples are set forth for the purposes of illustrating the present invention, and it will be understood that the invention is not to be limited thereby.

Example 1

Selective hydrogenation of a isophorone to trimethylcyclohexanone:

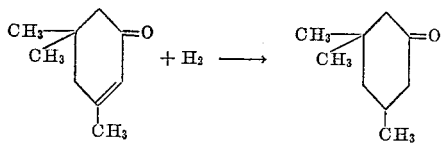

In a glass system as shown in FIG. 1 with a content of 800 cc. in sump 1, a length of 1800 mm. and a diameter of 30 mm. for column 2, and a column head 3, 200 cc. of reduced catalyst 4 is located in the lower third of the column. The catalyst is a commercially available nickel catalyst with about 30% nickel on alumina gel (grain size 3 x 4 mm). Above and below the catalyst zone distillation filler elements 5 and 6 are located in the form of $V_2A$ helices (4 x 4 mm.).

In normal running operation, the temperatures are approximately 196° C. in sump 1, about 184° C. in the catalyst area 4 and 160° C. in column 2 and head 3. The throughput amounts to 80 g. of isophorone and 120 normal liters of hydrogen per hour, the isophorone being fed into sump 1 through line 7 and the hydrogen through line 8. The distilling vapors pass from head 3 through line 9 to separator 10 where residual $H_2$ gas is drawn off by line 11 and condensed saturated ketone liquid is drawn off by line 12, a first part being recycled via line 13 and a second part being recovered by line 14. At a reflux ratio of about 2.5 (that means: out of 3.5 parts distilled 2.5 parts are returned to the head of the column as reflux), a water-clear product is recovered at line 14, which has a purity of better than 99% trimethylcyclohexanone. The yield in this experiment ran more than 98.5% with reference to the initial amount of isophorone used. In this manner, additional purification can be omitted entirely, or it is considerably easier to carry out when needed to meet the highest requirements of purity.

Example 2

Selective hydrogenation of mesityl oxide to methyl isobutyl ketone:

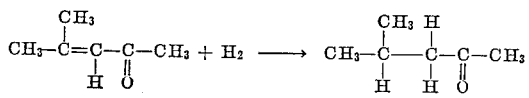

In a column-like system as shown in FIG. 2 consisting of a sump 15 with a 28-liter capacity, a column 16 8 meters high and 100 mm. in diameter, and a head 17, two separate layers or beds of catalyst 18, and 19 are located between one-meter and 2.5 meter heights, the lower bed 19 having a volume of about 5 liters and the upper bed 18 having a volume of about 3 liters. These catalyst beds are composed of an alumina gel support (6 x 6 mm. pellets) onto which 0.2% Pd has been sprayed. Raschig rings (10 x 10 mm.) are disposed above and below the catalyst layers at 20 and 21, respectively.

With continuous operation, and with the introduction of aprpoximately 4000 liters of hydrogen per hour into the sump via line 23, such sump is kept at a temperature of about 96° C. As a result, the temperature in the catalyst area 19 is about 91° C., and in the catalyst area 18 it is about 87° C. The boiling temperature that is established in the head 17 and upper column portion runs under these conditions (normal pressure) around approximately 82° C. Two kg. per hour of mesityl oxide are fed via line 22 into column 16 between the two catalyst beds 18 and 19. The distilling vapors pass from head 17 through line 24 to separator 25 where residual $H_2$ gas is drawn off by line 26 and condensed saturated ketone liquid is drawn off by line 27, a first part being recycled via line 28 and a second part being recovered by line 29. At a reflux ratio of about 3 (that means: out of every 4 parts distilled 3 parts are recycled), the entire heat of reaction of the hydrogenation, amounting to $\Delta H \sim -35$ kcal./mol ($\sim -350$ kcal./kg.) is taken up, so that the temperature in the sump cannot break through into the catalyst area. In the hydrogen circuit, including the draw off line 26 and feed line 23, the effective hydrogen consumption is compensated by the addition of approximately 450 liters per hour of fresh hydrogen gas via make-up line 30.

Under these circumstances, a product is obtained at line 29 which contains more than 99.6% methyl isobutyl ketone; the yield, with reference to the mesityl oxide introduced, amounts to more than 96% of the theory.

It will be appreciated that the instant specification is set forth for the purpose of illustration and not limitation, and that changes and modifications will occur to the artisan which may be made without departing from the spirit and scope of the present invention, such invention being limited only by the scope of the appended claims.

What is claimed is:

1. In the process for the continuous production of saturated ketones from unsaturated ketones selected from the group consisting of mesityl oxide, isophorone and homoisophorone, by catalytic hydrogenation at temperatures between about 50–250° C., the improvement which comprises carrying out the catalytic hydrogenation in a distillation zone while distilling off and recovering from such distillation zone the saturated ketone being produced under reflux of a portion of the distilling saturated ketone.

2. Improvement according to claim 1 wherein a pressure of at least 1 atmosphere is used, and the hydrogen is used in excess of the stoichiometrical amount.

3. Improvement according to claim 1 wherein the cataylst is a metal of the 8th Sub-group of the Periodic System.

4. Improvement according to claim 1 wherein a portion of the saturated ketone being distilled is returned to the distillation zone at a reflux ratio between about 1–10.

5. Improvement according to claim 1 wherein said distilling zone includes a lower sump, an intermediate column containing a hydrogenation catalyst, and an upper head, and the hydrogen used for the hydrogenation and the unsaturated ketone are introduced into the sump while the saturated ketone being distilled off is recovered from the head.

6. Improvement according to claim 5 wherein said cataylst is in bed form and the portion of the saturated ketone being refluxed is returned in part to said head and in part to said column at a point below said cataylst bed.

7. Improvement according to claim 1 wherein said distilling zone includes a lower sump, an intemediate column containing a plurality of separate spaced apart catalyst beds, and an upper head, and the hydrogen used for the hydrogenation is introduced into said sump while the unsaturated ketone is introduced into said intermediate column between corresponding catalyst beds and the saturated ketone being distilled off is recovered from said head.

8. In the process for the continuous production of saturated ketones from unsaturated ketones selected from the group consisting of mesityl oxide, isophorone and homoisophorone, and hydrogen in excess of the stoichiometrical amount by catalytic hydrogenation in the presence of a metal of the 8th Sub-group of the Periodic System as catalyst at temperatures between about 50–250° C., the improvement for the selective hydration of unsaturated ketones which comprises continuously carrying out the catalytic hydrogenation in a distilling zone having a lower sump, an intermediate column containing a hydrogenation catalyst in bed form, and an upper head, while continuously distilling off and recovering from such distillation zone the saturated ketone being produced under continuous reflux of a portion of the distilling saturated ketone in a reflux ratio between about 2–5, the temperature maintained in said head being lower than that in said column and the temperature maintained in said column being lower than that in said sump.

9. Improvement according to claim 8 wherein the hydrogen used for the hydrogenation and the unsaturated ketone are introduced into said sump, the saturated ketone being distilled off is recovered from said head, said catalyst is in the form of a bed, and the portion of the saturated ketone being refluxed is returned in part to said head and in part to said column at a point below said catalyst bed.

10. Improvement according to claim 8 wherein the hydrogen used for the hydrogenation is introduced into said sump, said catalyst is in the form of a plurality of separate spaced apart catalyst beds, the unsaturated ketone is introduced into said column between corresponding catalyst beds, the saturated ketone being distilled off is recovered from said head, and the portion of the saturated ketone being refluxed is returned in part to said head and in part to said column at a point below at least one of said catalyst beds.

References Cited
UNITED STATES PATENTS

| | | | |
|---|---|---|---|
| 2,081,322 | 5/1937 | Carney | 260—660 X |
| 2,825,743 | 3/1958 | MacLean | 260—593 |
| 2,867,663 | 1/1959 | Lacey | 260—593 |

LEON ZITVER, *Primary Examiner.*

M. JACOB, *Assistant Examiner.*